United States Patent
Nagpal et al.

(10) Patent No.: US 8,984,030 B2
(45) Date of Patent: Mar. 17, 2015

(54) JOURNALING AND INTEGRITY IN MOBILE CLOUDED COLLABORATIVE SPACES

(75) Inventors: Abhinay R. Nagpal, Pune (IN);
Sandeep R. Patil, Elmsford, NY (US);
Sri Ramanathan, Lutz, FL (US);
Matthew B. Trevathan, Kennesaw, GA (US)

(73) Assignee: International Business Machines Corporation, Armonk, NY (US)

( * ) Notice: Subject to any disclaimer, the term of this patent is extended or adjusted under 35 U.S.C. 154(b) by 581 days.

(21) Appl. No.: 13/100,366

(22) Filed: May 4, 2011

(65) Prior Publication Data

US 2012/0284314 A1 Nov. 8, 2012

(51) Int. Cl.
*G06F 17/30* (2006.01)
*H04W 4/02* (2009.01)
*G06F 11/14* (2006.01)

(52) U.S. Cl.
CPC ........... *H04W 4/02* (2013.01); *G06F 17/30371* (2013.01); *G06F 11/1471* (2013.01)
USPC ............................ 707/822; 707/825; 711/118

(58) Field of Classification Search
CPC .............. G06F 3/0481; G06F 17/3089; G06F 17/30047; G06F 17/30056; G06F 17/30241
See application file for complete search history.

(56) References Cited

U.S. PATENT DOCUMENTS

| | | | |
|---|---|---|---|
| 6,405,028 B1 * | 6/2002 | DePaola et al. | 455/406 |
| 7,076,480 B2 | 7/2006 | Scardo et al. | |
| 7,493,103 B2 | 2/2009 | Finley, Jr. et al. | |
| 8,660,530 B2 * | 2/2014 | Sharp et al. | 455/411 |
| 2004/0261073 A1 * | 12/2004 | Herle et al. | 717/173 |
| 2005/0182781 A1 * | 8/2005 | Bouvet | 707/102 |
| 2007/0087756 A1 * | 4/2007 | Hoffberg | 455/450 |
| 2007/0111748 A1 | 5/2007 | Risbood | |
| 2007/0286189 A1 * | 12/2007 | Kreiner et al. | 370/389 |
| 2008/0154714 A1 | 6/2008 | Liu et al. | |
| 2008/0189360 A1 * | 8/2008 | Kiley et al. | 709/203 |
| 2008/0201467 A1 * | 8/2008 | Delany et al. | 709/224 |

(Continued)

FOREIGN PATENT DOCUMENTS

WO 2010068505 6/2010

OTHER PUBLICATIONS

Kirzner, "Dynamic Data-Driven Enterprise Application Development Using Scalable Vector Graphics", IDC Analyze the Future, Jun. 2003, pp. 1-11.

(Continued)

*Primary Examiner* — Angelica Ruiz
(74) *Attorney, Agent, or Firm* — Matthew Chung; Roberts Mlotkowski Safran & Cole, P.C.

(57) ABSTRACT

Methods and systems for journaling and integrity in mobile clouded collaborative spaces are provided. A method includes receiving input data of a mobile device, caching the input data to a remote device, and receiving information associated with the mobile device. The method further includes sending a journaling mode command to the mobile device which instructs the mobile device to journal the input data, based on the information associated with the mobile device.

19 Claims, 11 Drawing Sheets

(56) References Cited

U.S. PATENT DOCUMENTS

| | | | |
|---|---|---|---|
| 2008/0256142 A1* | 10/2008 | Wakefield | 707/203 |
| 2010/0010690 A1 | 1/2010 | Yoshimura et al. | |
| 2010/0041391 A1 | 2/2010 | Spivey et al. | |
| 2010/0161720 A1 | 6/2010 | Colligan et al. | |
| 2010/0222052 A1 | 9/2010 | Barzegar et al. | |
| 2010/0280748 A1 | 11/2010 | Mundinger et al. | |
| 2011/0014929 A1 | 1/2011 | Moshfeghi et al. | |
| 2011/0122866 A1* | 5/2011 | Vasamsetti et al. | 370/352 |

OTHER PUBLICATIONS

Ng et al., "Network Mobility Route Optimization Solution Space Analysis (RFC4889)", IP.com PriorArt Database, Jul. 1, 2007, 40 pages.

Mell et al., "The NIST Definition of Cloud Computing", Version 15, Oct. 7, 2009, 2 pages.

Lundsgaard et al., "Sampling and Reporting of Signal Strength with Time and Location Information", IP.com PriorArt Database, Sep. 16, 2003, 5 pages.

* cited by examiner

JOURNALING AND INTEGRITY IN MOBILE CLOUDED COLLABORATIVE SPACES

TECHNICAL FIELD

The present invention generally relates to cloud computing, and more particularly, to methods and systems for journaling and integrity in mobile clouded collaborative spaces.

BACKGROUND

Information technology is changing rapidly and now forms an invisible layer that increasingly touches nearly every aspect of business and social life. An emerging computer model known as cloud computing addresses the explosive growth of Internet-connected devices, and complements the increasing presence of technology in today's world. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

Cloud computing is massively scalable, provides a superior user experience, and is characterized by new, Internet-driven economics. In one perspective, cloud computing involves storage and execution of business data inside a cloud which is a mesh of inter-connected data centers, computing units and storage systems spread across geographies.

Wireless communication networks used in cloud computing include growing numbers of users and types of technology. Such changes in the size and complexity of the wireless communication networks also increase the amount of operational and performance problems in the wireless communication networks. For example, these wireless communication networks can include various reliability issues, such as dropped calls, lack of coverage, and poor audio quality. Such difficulties lead to user frustration and increased costs. In fact, quality of service often has a direct impact on wireless service providers' profitability, and thus, improving the quality of service is a top priority for these wireless service providers.

When traveling, a wireless user's signal strength varies, and sometimes, the signal drops. This is problematic when the wireless user is using a mobile device to facilitate business (e.g., online transaction processing (OLTP)) that requires cloud computing over the Internet. For instance, the wireless user may be entering data into a form, which is sent over the Internet to a database at fixed intervals known as checkpoints. These checkpoints can also be instantaneous times at which the uncommitted data becomes committed into the database. However, when the signal drops, if the form data has not been sent to and/or committed at the database (e.g., the checkpoints have not been reached), the form data may be lost.

SUMMARY

In a first aspect of the invention, a method includes receiving input data of a mobile device, caching the input data to a remote device, and receiving information associated with the mobile device. The method further includes sending a journaling mode command to the mobile device which instructs the mobile device to journal the input data, based on the information associated with the mobile device.

In another aspect of the invention, a system implemented in hardware, includes a computer infrastructure operable to receive at least a location of a mobile device and mobile device information. The computer infrastructure is further operable to receive input data of the mobile device, and commit the input data into a database based on at least one of the location, the mobile device information, and a current time interval between the input data.

In an additional aspect of the invention, a computer program product includes a computer usable storage medium having readable program code embodied in the storage medium, the computer program product includes at least one component operable to receive input data of a mobile device, and cache the input data to a remote device. The at least one component is further operable to receive information associated with the mobile device, and send a journaling mode command to the mobile device which instructs the mobile device to journal the input data, based on the information associated with the mobile device.

In a further aspect of the invention, a method of deploying a system for journaling and integrity in mobile collaborative spaces, includes providing a computer infrastructure, being operable to send a location of a mobile device to a computing node. The computer infrastructure is further operable to journal input data of the mobile device, when the computing node instructs the mobile device to journal the input data based on the location, and send the input data to the computing node to be committed into a database based on at least one of the location and the input data.

In another aspect of the invention, a computer system for journaling and integrity in mobile collaborative spaces, includes a CPU, a computer readable memory and a computer readable storage media. First program instructions receive at least one of an event detected at a mobile device, a location of the mobile device, and mobile device information, and second program instructions generate a map of problematic areas based on at least one of the event, the location, the mobile device information, and information received from other mobile devices. Third program instructions receive input data of the mobile device. Fourth program instructions send a journaling mode command to the mobile device which instructs the mobile device to journal the input data based on the generated map and the location, and fifth program instructions commit the input data into a database based on at least one of the generated map, the location, and a current time interval between the input data. The first, second, third, fourth, and fifth program instructions are stored on the computer readable storage media for execution by the CPU via the computer readable memory.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
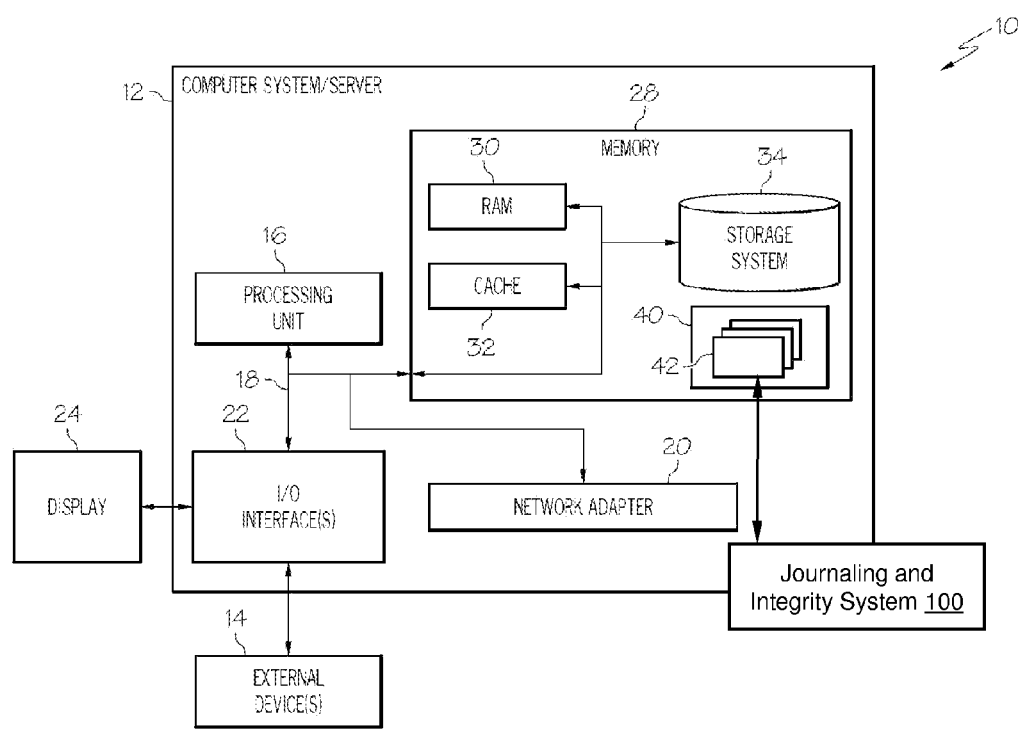
FIG. 1 depicts a cloud computing node according to an embodiment of the present invention.

The present invention generally relates to cloud computing, and more particularly, to methods and systems for journaling and integrity in mobile clouded collaborative spaces. In accordance with aspects of the invention, a user can input data in a mobile computing device that may be used for, e.g., a transaction with a data driven enterprise application (DDEA) over a cloud computing environment or a mobile clouded collaborative space. In embodiments, while inputting the data in the mobile computing device, the user can travel into an area where the mobile computing device begins losing its wireless signal or connection to the cloud computing environment. A journaling and integrity system of the present invention can determine a location of the mobile computing device and other information (e.g., a signal strength) of the mobile computing device, and based on this information, instruct the mobile computing device to journal (e.g., log, temporarily store, and/or cache) the inputted data, to prevent the user from losing the inputted data. In addition, the journaling and integrity system may receive the inputted data from the mobile computing device, and based on the information pertaining to the mobile computing device and arrival times of the inputted data, commit the inputted data into a database, to maintain the integrity of the inputted data.

In this manner, implementations of the invention advantageously provide the mobile computing device with the ability to journal the inputted data when the user enters a problematic area (e.g., an area without a signal) for later committing into the database when wireless service improves (e.g., when the signal is reestablished). In embodiments, the present invention dynamically adapts the committing of the inputted data into the database based on user location. Also, the system can determine time intervals between data arrival, and if any of these time intervals is over a threshold value, the system can commit the data. A large time interval may be indicative of poor wireless coverage. Alternatively or in addition, the present invention can monitor the location of the wireless user and, using a look-up table, can overlay such location information to service maps indicative of coverage areas and signal strengths. By mapping this information, the present invention may proactively commit or journal data when the wireless user is entering a poor coverage area or zone.

Cloud Computing

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

For convenience, the Detailed Description includes the following definitions which have been derived from the "Draft NIST Working Definition of Cloud Computing" by Peter Mell and Tim Grance, dated Oct. 7, 2009, which is cited in an IDS filed herewith, and a copy of which is attached thereto.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth herein.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16. In embodiments, the computer system/server 12 comprises or communicates with a journaling and integrity system 100 that determines a location of a mobile computing device and other information (e.g., a signal strength) of the mobile computing device. Based on this information, the journaling and integrity system 100 instructs the mobile computing device to journal (e.g., log, temporarily store, and/or cache) the inputted data, to prevent loss of the inputted data. In addition, the journaling and integrity system 100 receives the inputted data from the mobile computing device, and based on the information pertaining to the mobile computing device and arrival times of the inputted data, commits the inputted data into a database, to maintain the integrity of the inputted data.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein, e.g., provide control, function, and operability of the journaling and integrity system 100. For example, the journaling and integrity system 100 can determine time intervals between data arrival, and if any of these time intervals is over a threshold value, the system 100 can commit the data. The journaling and integrity system 100 may also monitor the location of the mobile computing device and, using a look-up table, may overlay such location information to service maps indicative of coverage areas and signal strengths. Through this overlaying over the service maps, the journaling and integrity system 100 can proactively commit or journal the data when the mobile computing device is traveling into a poor coverage area, for instance.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20.

As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
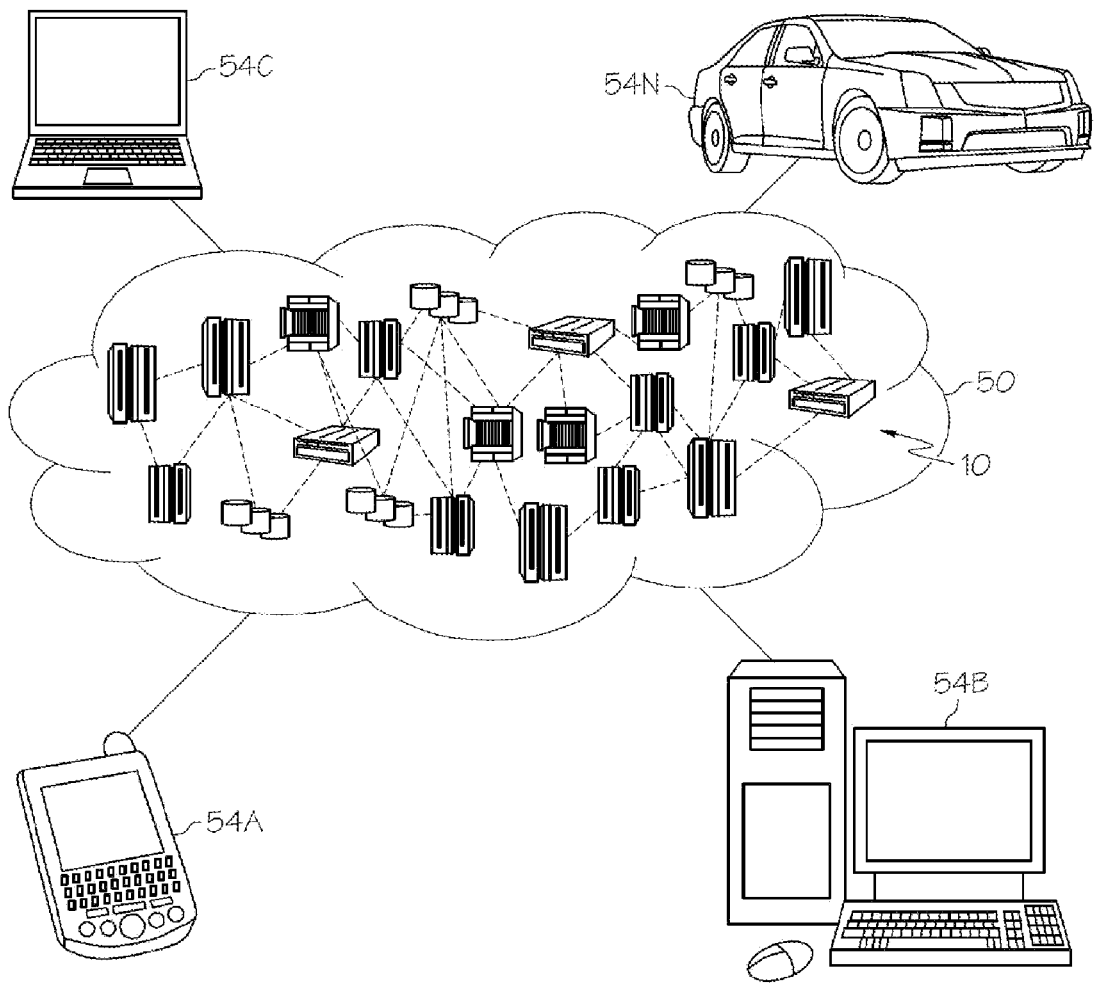
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
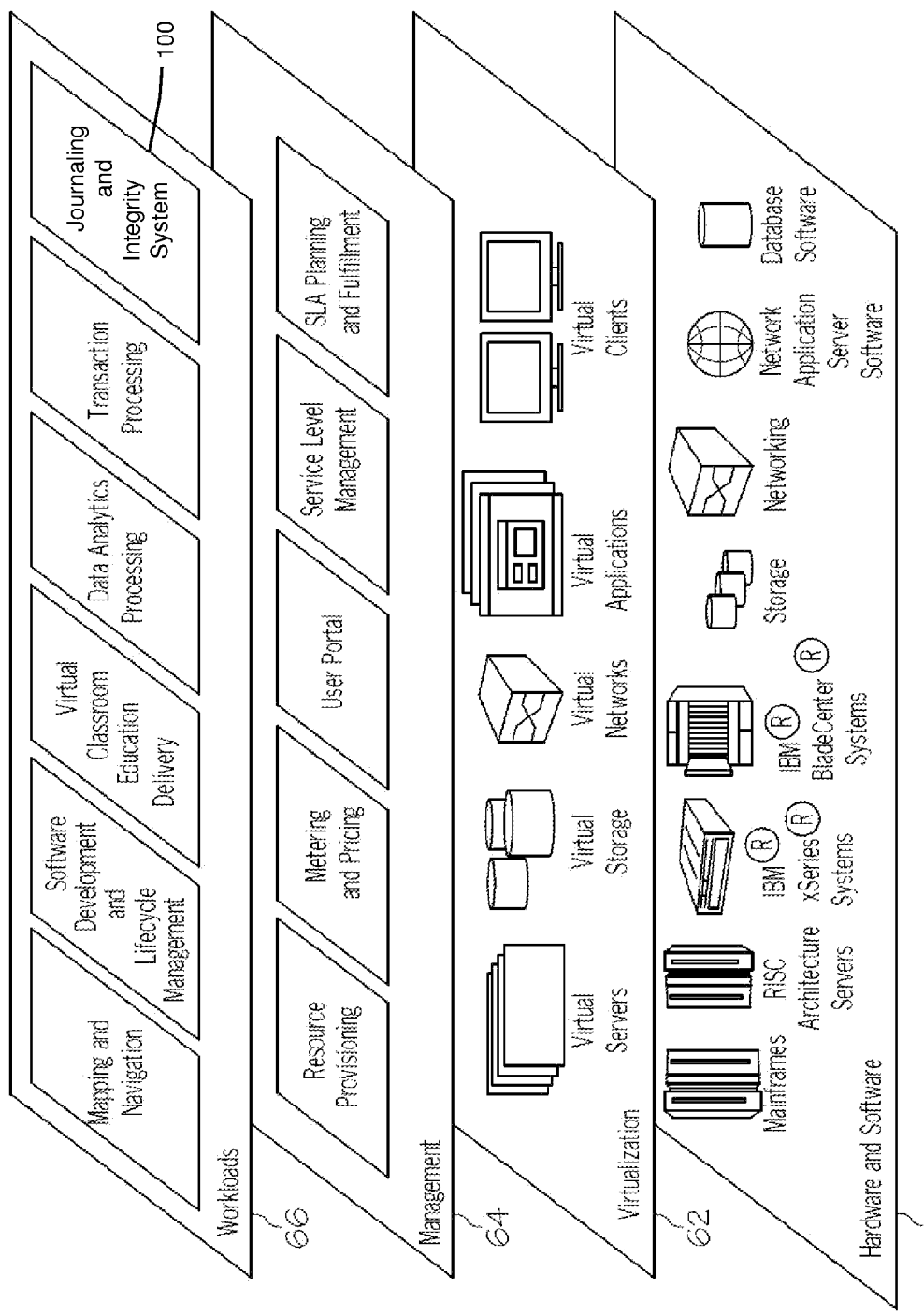
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and journaling and integrity system 100 that controls when cloud consumer data in the cloud computing environment 50 is journaled (e.g., logged, temporarily stored, and/or cached) in a local computing device and/or committed (e.g., stored) in a database. For example, in the cloud computing environment 50, cloud consumer data can be journaled in mobile computing devices, such as the cellular telephone 54A, the laptop computer 54C, and/or the automobile computer system 54N. In embodiments, the cloud consumer data may also be transferred from such mobile computing devices to the nodes 10, where the cloud consumer data is committed into databases located in the nodes 10 to provide data integrity. In accordance with aspects of the invention, the journaling and integrity system 100 causes the cloud consumer data to be journaled in the mobile computing devices based on, e.g., locations and other information pertaining to these mobile computing devices. The journaling and integrity system 100 further causes the cloud consumer data to be committed in the databases based on, e.g., the locations and other information pertaining to the mobile computing devices and time intervals between input data received from these mobile computing devices. In this manner, implementations of the invention allow the cloud consumer data to be journaled and/or committed at optimal times and before for instance, the cloud consumer data is lost due to the mobile computing devices losing their connections to the nodes 10.

More specifically, a user of a mobile computing device (e.g., the cellular telephone 54A, the laptop computer 54C, and/or the automobile computer system 54N) can input data into the mobile computing device in order to, for example, facilitate an online transaction with a remote computing device. The mobile computing device can lose its connection with the remote computing device, in which case journaling and integrity system 100 can either instruct the mobile computing device to journal the inputted data or request the remote computing device to commit the inputted data. In embodiments, the journaling and integrity system 100 can have its own database for committing the inputted data, or be resident on the remote computing device which is associated with the online transaction.

More specifically, implementations of the invention provide the mobile computing device the abilities to determine and send its location (and other pertinent information) to the journaling and integrity system 100, where the location is used to determine and send a command to the mobile computing device to enter into a journaling mode. For example, via the location of the mobile computing device, the journaling and integrity system 100 may be made aware in real-time when the mobile computing device enters into a particular area and/or at a particular time of day that a signal strength of the mobile computing device may be weak and may drop off. This location information may be stored in a storage device such as, for example, the storage system 34 of FIG. 1. In response, the journaling and integrity system 100 can instruct the mobile computing device to journal the data inputted by the user, to prevent such data from being lost. In addition, the journaling and integrity system 100 may receive the inputted data from the mobile computing device, and commit the inputted data based on, e.g., the location of the mobile computing device and time intervals between the inputted data. For instance, the journaling and integrity system 100 can determine that the mobile computing device has entered an area or zone that has a weak signal strength, and can determine to commit the inputted data more frequently, to maintain data integrity. In another example, the journaling and integrity system 100 may determine that the time intervals between the inputted data is greater than a predetermined threshold, and if so, will instruct (e.g., provide a command to) the remote computing device to commit the inputted data. Advantageously, the journaling and integrity system 100 can dynamically adapt to the time intervals (e.g., frequency) of the inputted data and commit the inputted data at an optimal time, which may require less resource utilization than committing the inputted data at a fixed time interval when such committing is not necessary to provide data integrity.

Figure 4:
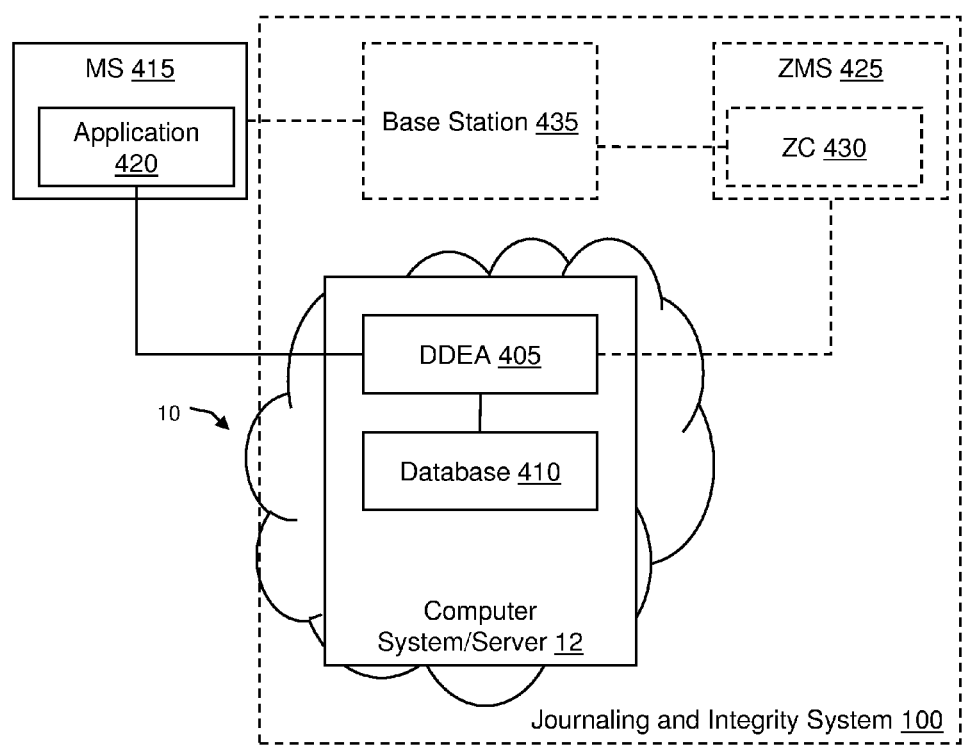
FIG. 4 depicts an illustrative environment according to an embodiment of the present invention.

FIG. 4 depicts an illustrative environment according to an embodiment of the present invention. The journaling and integrity system 100 may include a data driven enterprise application (DDEA) 405 and a database 410, implemented in the computer system/server 12 of FIG. 1, for example. The computer system/server 12 can be in the cloud computing node 10 and practiced in distributed cloud computing environments. The DDEA 405 commits (e.g., stores) received and cached data into the database 410, or any database of a remote computing device.

In embodiments, the DDEA 405 can be in communication with a mobile station (MS) 415, specifically, an application 420 installed on the MS 415. For example, the MS 415 may be the cellular telephone 54A, the laptop computer 54C, and/or the automobile computer system 54N in FIG. 2. The MS 415 can include a Session Initiation Protocol (SIP) client connected to a baseband and voice application/dialer of the MS 415. The SIP client allows the MS 415 to communicate with other entities, e.g., the DDEA 405, in SIP. The application 420 may be downloaded to the MS 415 from an Internet Protocol (IP) Multimedia Subsystem (IMS) service provider, e.g., the computer system/server 12.

In accordance with aspects of the present invention, the application 420 of the MS 415 sends to the DDEA 405 at least a location of the MS 415 received from, for instance, a Global Positioning System (GPS), a location service, and/or another application installed on the MS 415. In embodiments, the application 420 can also send to the DDEA 405 other information pertaining to the MS 415, e.g., a problematic event detected at the MS 415 and/or a signal strength of the MS 415. The DDEA 405 receives the location of the MS 415 and the other information pertaining to the MS 415. The DDEA 405 may also receive information pertaining to one or more MS. Such information can be from the most common areas trafficked by the MS 415 and can be used to verify coverage levels in the most common areas trafficked by the MS 415.

In embodiments, the DDEA 405 sends a journaling mode command to the application 420 of the MS 415 that instructs the application 420 to set a journaling mode of the application 420, based on at least one map of, e.g., coverage areas and signal strengths, and the information (e.g., the location) pertaining to the MS 415. In embodiments, the map may indicate areas (e.g., geo-boundaries) where problematic events and/or poor quality readings have been received from one or more MS, and may indicate areas where no information has been collected from one or more MS. The map can be generated periodically, e.g., weekly, and can be generated by a Graphical Information System (GIS), based on the information pertaining to one or more MS. The generated map and the information pertaining to one or more MS can be stored in a look-up table that can include other generated maps and information pertaining to other MS. Based on the generated map(s) and the location of the MS 415, the DDEA 405 can determine that the MS 415 has entered at least one of the areas where problematic events (e.g., dropped calls, poor coverage, etc.), poor quality signals, and/or no signals have been received from an MS. The DDEA 405 may then determine that the application 420 should be instructed to set the journaling mode, to prevent input data of the MS 415 from being lost while the MS 415 is in at least one of the problematic areas.

In embodiments, the application 420 of the MS 415 determines whether the application 420 received the journaling mode command from the DDEA 405. Upon receipt of the journaling mode command, the application 420 journals (e.g., logs, temporarily stores, and/or caches) the input data of the MS 415. In embodiments, the input data of the MS 415 can be data inputted by a user via a user interface of the MS 415, for the purposes of, e.g., facilitating online transaction processing (OLTP) over the cloud computing node 10 and the distributed cloud computing environments. The application 420 can also send the input data of the MS 415 to the DDEA 405 for committing into the database 410.

In embodiments, the DDEA 405 receives input data of the MS 415 from the application 420 for committing into the database 410 or another database of a remote computing device (hereinafter generally referred to as the database 410 in FIG. 4). In embodiments, the DDEA 405 may cache the input data received from the application 420 for later commitment into the database 410. For example, the DDEA 405 can commit the input data based on, for instance, the information (e.g., the location) pertaining to the MS 415, and a current interval of time between an arrival time of a current input data and an arrival time of a previous input data of the MS 415. For example, the DDEA 405 may commit the input data when the DDEA 405 determines that the MS 415 has entered and/or exited at least one of the problematic areas on the generated map(s) in the look-up table. In another example, the DDEA 405 can commit the input data when the current interval of the arrival times between the current and the previous input data is greater than a threshold interval dynamically determined by the DDEA 405 based on the current interval. By taking into account the current interval, the commit strategy of the DDEA 405 adapts to a signal strength of the MS 415 and a congestion in a wireless communication network; compared to being fixed at a regular time interval.

In embodiments, the journaling and integrity system 100 can further include a Zone Management System (ZMS) 425, which may include a Zone Controller (ZC) 430 and a base station 435. The ZMS 425, via the ZC 430, may manage and monitor data traffic of one or more MSs and base stations in a zone (e.g., geographical area) covered by a wireless communication network. For example, the DDEA 405 may communicate with the ZMS 425 to request and receive location information of the MS 415, as well as other information pertaining to the MS 415. The ZMS 425 can contact the ZC 430, which is in communication with the MS 415, to obtain the requested information.

In response to the ZMS 425, the ZC 430 sends a request via the base station 435 to the MS 415 for the requested information. In embodiments, the ZC 430 can send this request when data traffic levels are low. The request may include an Outbound Signal Word (OSW). The OSW may be a Bit Error Rate (BER) test string, which includes a predetermined bit pattern. If the MS 415 receives the OSW, the MS 415 sends the location of the MS 415, the other information pertaining to the MS 415, and the OSW (including a base station ID) to the ZC 430, via the base station 435. The ZC 430 can record a number of bits of the OSW, which was received by the MS 415, that does not match the original OSW. This number can be forwarded, along with the location of the MS 415 and the other information pertaining to the MS 415, via the ZMS 425 to the DDEA 405. In this manner, the MS 415 does not send its pertinent status information to the DDEA 405 until the MS 415 is queried by the DDEA 405 through the ZMS 425, the ZC 430, and the base station 435.

As will be appreciated by one skilled in the art, aspects of the present invention, including the journaling and integrity system 100 and the functionality provided therein, may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIGS. 5-11 show exemplary flows for performing aspects of the present invention. The steps of FIGS. 5-11 may be implemented in the environments of FIGS. 1-4, for example.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, the invention can take the form of a computer program product accessible from a computer-usable or computer-readable medium providing program code for use by or in connection with a computer or any instruction execution system. The software and/or computer program product can be implemented in the environments of FIGS. 1-4. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

Figure 5:
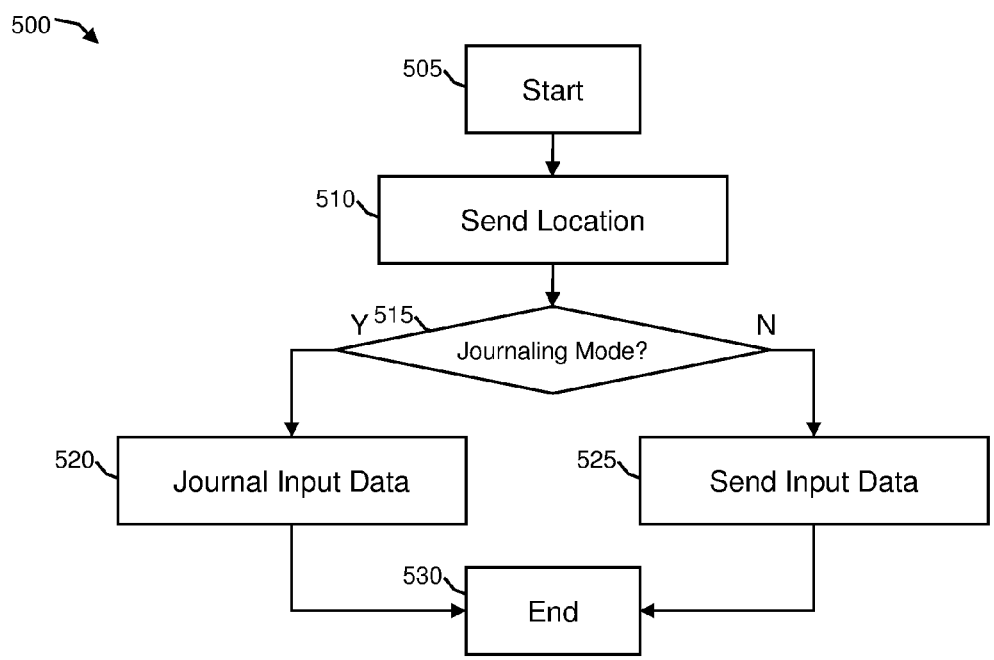
FIGS. 5-11 depict exemplary flow diagrams according to embodiments of the present invention.

FIG. 5 depicts an exemplary flow for a process 500 in accordance with aspects of the present invention. In embodiments, the process 500 can be performed by an application of a MS, e.g., the application 420 of the MS 415 in FIG. 4. At step 505, the process starts. At step 510, the application sends at least a location of the MS to a journaling and integrity system (e.g., the journaling and integrity system 100 in FIG. 4) or other service providers. In embodiments, the location can be sent to a DDEA (e.g., the DDEA 405 in FIG. 4). The location information may be obtained by, for example, a GPS, a location service, and/or another application installed on the MS.

At step 515, the application determines whether the application received a journaling mode command, e.g., an instruction to set a journaling mode of the application. For example, based on information pertaining to the MS and possibly information pertaining to other MSs, the DDEA may determine whether the MS has traveled past a geo-boundary indicating a poor service signal. Accordingly, the DDEA can send a journaling mode command to the application that instructs the application to begin a journaling mode. This will prevent losing data in a poor service area. If the application is instructed to set the journaling mode, then the process continues at step 520. Otherwise, the process continues at step 525. In the journaling mode, at step 520, the application journals (e.g., logs, temporarily stores, and/or caches) input data of the MS. In embodiments, the input data of the MS can be data inputted by a user via a user interface of the MS, for the purposes of, e.g., facilitating OLTP over cloud computing infrastructure. At step 525, in optional embodiments, the application sends the input data of the MS to the DDEA for committing into a database. At step 530, the process ends.

Figure 6:
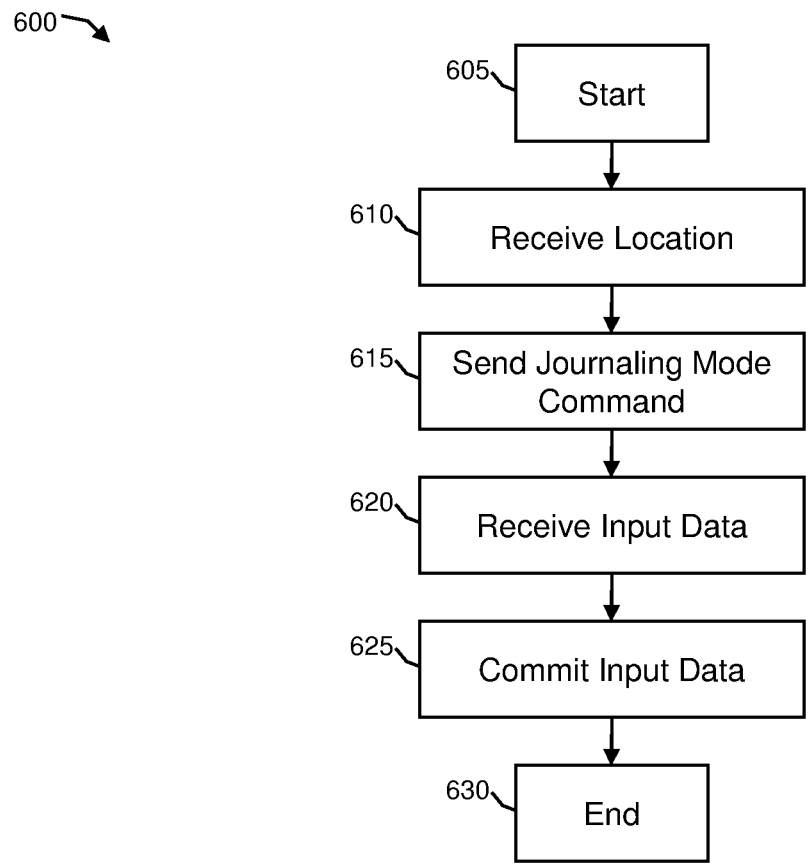

FIG. 6 depicts an exemplary flow for a process 600 in accordance with aspects of the present invention. In embodiments, the process 600 can be performed by a DDEA, e.g., the DDEA 405 in FIG. 4. At step 605, the process starts. At step 610, the DDEA receives at least a location of an MS, e.g., from an application of the MS (e.g., the application 420 of the MS 415 in FIG. 4) and/or a ZMS (e.g., the ZMS 425 in FIG. 4). The DDEA may also receive information pertaining to other MSs and/or the ZMS. Such information can be from the most common areas trafficked by a MS, the data signal strength in such areas, and any other recorded problems, which can be used to verify coverage levels in the most common areas trafficked by the MS.

At step 615, the DDEA sends a journaling mode command to the application of the MS that instructs the application of the MS to set a journaling mode of the application of the MS, based on at least one map and the information (e.g., the location) pertaining to the MS or other noted problems. In embodiments, the map can be generated periodically, e.g., weekly, and can be generated by a GIS. The map may indicate areas (e.g., geo-boundaries) where problematic events and/or poor quality readings have been received, and may indicate areas where no information has been collected from the MSs. The generated map and the information pertaining to the MS can be stored in a look-up table for subsequent events. For example, based on the generated map and the location of the currently active MS, the DDEA can determine that the MS has entered at least one of the areas where problematic events, poor quality readings, and/or no information have been received and/or recorded from MSs ("problematic areas"). The DDEA may then determine that the application of the MS should be instructed to set the journaling mode, to prevent input data of the MS from being lost while the MS is in at least one of the problematic areas.

At step 620, the DDEA receives input data of the MS from the application of the MS for committing into the database. In embodiments, the DDEA may cache the input data received from the application of the MS for later commitment into the database. At step 625, the DDEA commits the input data based on, for instance, the information (e.g., the location) pertaining to the MS, and a current interval of time between an arrival time of a current input data of the MS and an arrival time of a previous input data of the MS. For example, the DDEA may commit the input data when the DDEA determines that the MS has entered and/or exited at least one of the problematic areas on generated maps from the look-up table. In another example, the DDEA can commit the input data when the current interval of the arrival times between the current and the previous input data is greater than a threshold interval dynamically determined by the DDEA based on the current interval. By taking into account the current interval, the DDEA's commit strategy adapts to a signal strength and a congestion in the MS's wireless communication network, instead of being fixed at a regular time interval. At step 630, the process ends.

Figure 7:
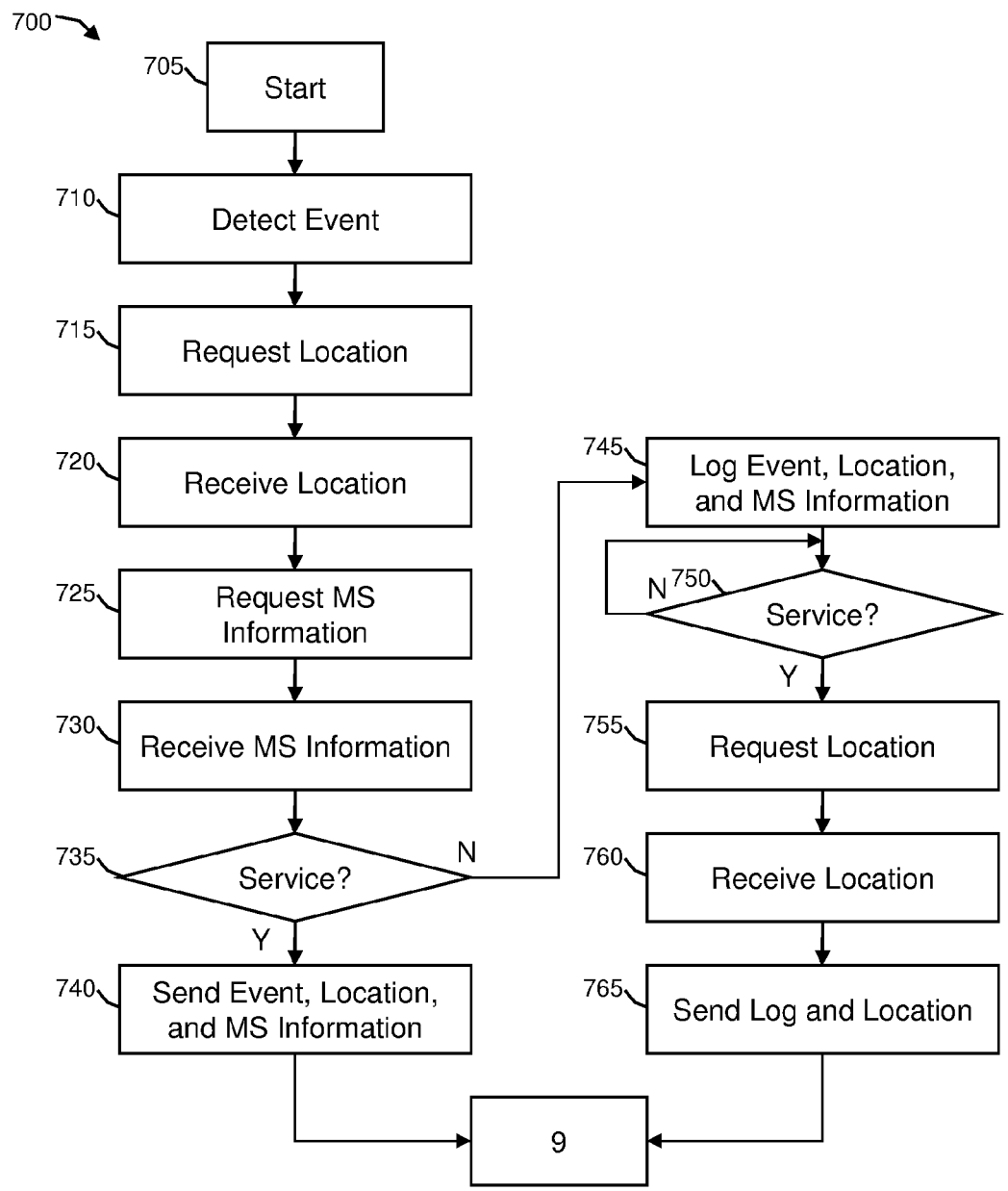

FIG. 7 depicts an exemplary flow for a process 700 in accordance with aspects of the present invention. In embodiments, the process 700 can be performed by an application of a MS (e.g., the application 420 of the MS 415 in FIG. 4) to send information pertaining to the MS to a DDEA, e.g., the DDEA 405 in FIG. 4. This information can be used to generate a map indicative of signal strength, problematic areas, etc., which may be used during subsequent events. At step 705, the process starts. At step 710, the application detects an event at the MS. For example, the event may be a problem at the MS, such as a lost signal, a poor data rate, a low reception, etc.

At step 715, the application requests a location of the MS from, for example, a GPS, a location service, and/or another application installed on the MS. At step 720, the application receives the location of the MS. At step 725, the application requests information from the MS. In embodiments, the information can include a MS type, a reason why a call or connection failed, a reception value, a data rate quality, an instance signal strength, a bit error rate (BER), a time, a velocity, a MS identification (ID), a battery level, etc. At step 730, the application receives MS information from the MS.

At step 735, the application determines whether the MS has wireless service, e.g., a connection to the DDEA. If the MS has wireless service, then the process continues at step 740. Otherwise, the process continues at step 745. At step 740, the application sends the event at the MS, the location of the MS, and and/or the MS information to the DDEA, for example, via SIP messaging. At step 745, after determining that the MS does not have wireless service, the application logs the event at the MS, the location of the MS, and the MS information in, for instance, a cache of the MS.

At step 750, the application determines whether the MS has regained wireless service. If the MS has wireless service, then the process continues at step 755. Otherwise, the process returns to step 750. At step 755, when the MS regains wireless service, the application requests the location of the MS. At step 760, the application receives the location of the MS. At step 765, the application sends a log of the event at the MS, the logged location of the MS, and the MS information, and the current location of the MS, to the DDEA. The process continues in FIG. 9, which is described in detail below.

Figure 8:
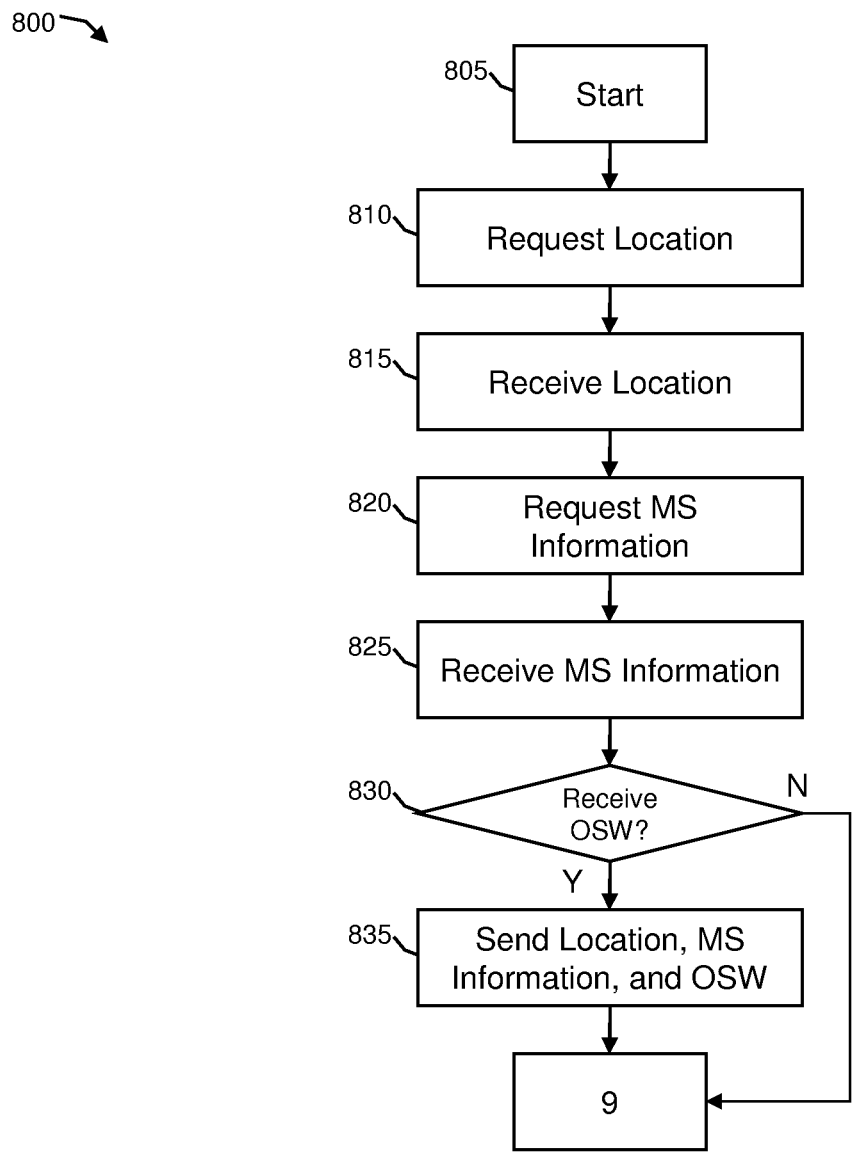

FIG. 8 depicts an exemplary flow for a process 800 in accordance with aspects of the present invention. In embodiments, the process 800 can be performed by an application of a MS (e.g., the application 420 of the MS 415 in FIG. 4) to determine and send information pertaining to the MS to a DDEA, e.g., the DDEA 405 in FIG. 4. The process 800 of determining and sending the information pertaining to the MS is an alternative to the process 700.

At step 805, the process starts. At step 810, the application requests a location of the MS from, for example, the GPS, the location service, and/or another application installed on the MS. At step 815, the application receives the location of the MS. At step 820, the application requests information from the MS. In embodiments, the information can include a MS type, a reason why a call or connection failed, a reception value, a data rate quality, an instance signal strength, a BER, a time, a velocity, a MS ID, a battery level, etc. At step 825, the application receives MS information from the MS.

At step 830, the application determines whether the MS receives an OSW from a ZC in a ZMS (e.g., the ZC 425 in the ZMS 430) via a base station, e.g., the base station 435. In embodiments, the OSW is a BER test string including a predetermined bit pattern. If the MS receives the OSW, then the process continues in FIG. 9, which is described in detail below. Otherwise, the process continues at step 835, where the MS sends the location of the MS, the MS information, and the OSW (including a base station ID) to the ZC, via the base station. The ZC records a number of bits of the OSW the MS received that do not match the original OSW and forwards this number, along with the location of the MS and the MS information, via the ZMC to the DDEA. The process continues in FIG. 9, which is described in detail below.

Figure 9:
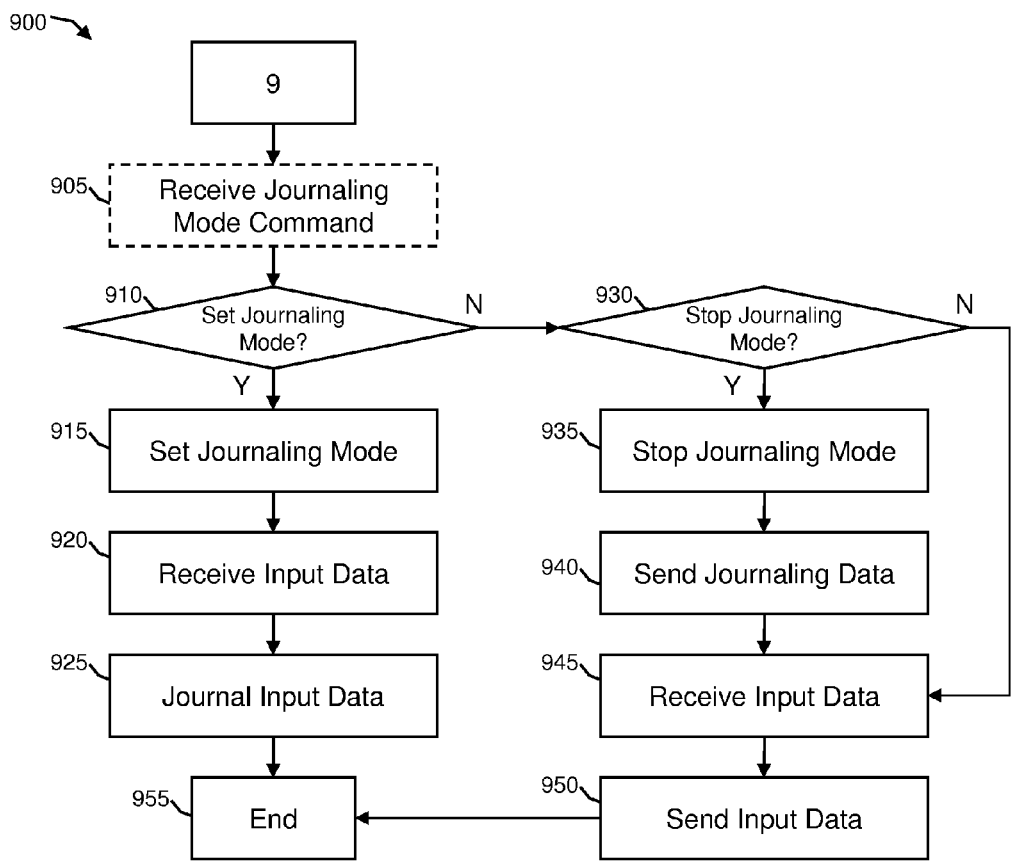

FIG. 9 depicts an exemplary flow for a process 900 in accordance with aspects of the present invention. In embodiments, the process 900 can be performed by an application of a MS (e.g., the application 420 of the MS 415 in FIG. 4) to journal and/or send input data of the MS to a DDEA (e.g., the DDEA 405 in FIG. 4). At optional step 905, the process starts, where in embodiments, the application can receive a journaling mode command from a DDEA. The journaling mode command instructs the application to either set or stop a journaling mode of the application. For example, based on information pertaining to the MS received from the MS and possibly information pertaining to other MSs received from these MSs, the DDEA may determine whether the MS has traveled past a geo-boundary indicating a poor service signal. Accordingly, the DDEA can send a journaling mode command to the application that instructs the application to begin a journaling mode, to prevent losing data in a poor service area.

At step 910, the application determines whether a set journaling mode command is received that instructs the application to set the journaling mode. If the application is instructed to set the journaling mode, then the process continues at step 915. Otherwise, the process continues at step 930. At step 915, the application sets the journaling mode. In the journaling mode, at step 920, the application receive input data of the MS from the MS, and at step 925, the application journals (e.g., logs, temporarily stores, and/or caches) the input data in the MS. In embodiments, the input data of the MS can be data inputted by a user via a user interface of the MS, for the purposes of, e.g., facilitating OLTP over cloud computing infrastructure. The process continues at step 955.

At step 930, the application determines whether a stop journaling mode command is received that instructs the application to stop the journaling mode. If the application is instructed to stop the journaling mode, then the process continues at step 935. Otherwise, the process continues at step 940. At step 935, the application stops the journaling mode. In this manner, at step 940, the application sends journaling data previously journaled in the MS to the DDEA for committing into a database. At step 945, the application receives the input data of the MS from the MS. At step 950, the application sends the input data of the MS to the DDEA for committing into the database. At step 955, the process ends.

Figure 10:
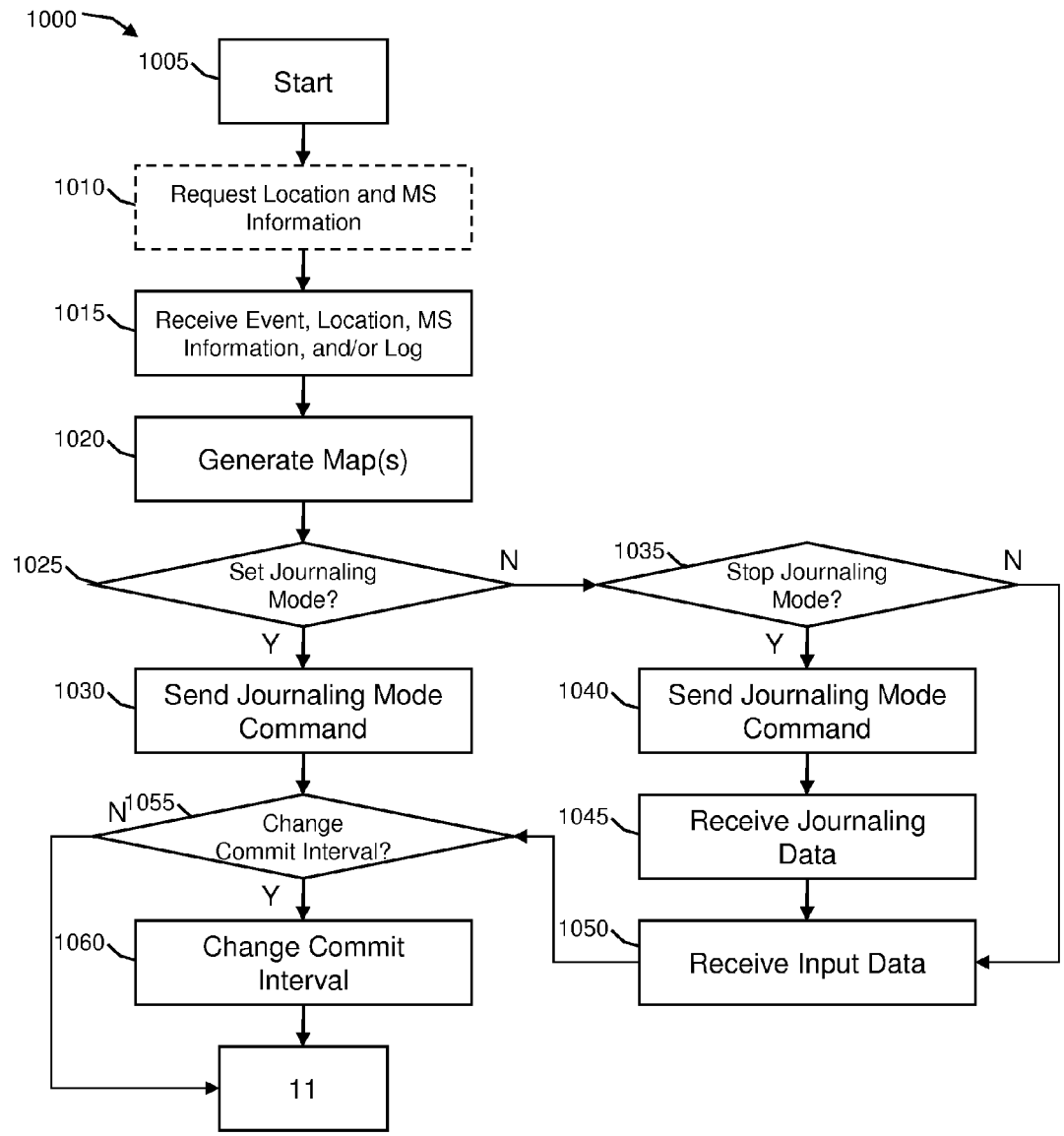

FIG. 10 depicts an exemplary flow for a process 1000 in accordance with aspects of the present invention. In embodiments, the process 1000 can be performed by a DDEA (e.g., the DDEA 405 in FIG. 4) to determine and send a journaling mode command to an application of a MS, e.g., the application 420 of the MS 415 in FIG. 4. At step 1005, the process starts. At optional step 1010, the DDEA can request a location of the MS and MS information from a ZMS (e.g., the ZMS 425 in FIG. 4) that contacts a ZC (e.g., the ZC 430 in FIG. 4) to obtain the requested information. At step 1015, the DDEA receives an event at the MS, the location of the MS, the MS information, and/or a log including all of the above information from the application and/or the ZMS. The DDEA may also receive information pertaining to other MSs from these other MSs and/or the ZMS. Such information can be from the most common areas trafficked by a MS and can be used to verify coverage levels in the most common areas trafficked by the MS.

At step 1020, the DDEA generates at least one map based on the received information pertaining to the MS and/or the other MSs. In embodiments, the map can be generated periodically, e.g., weekly, and can be generated by a GIS. The map may indicate areas (e.g., geo-boundaries) where problematic events and/or poor quality readings have been received from MSs, as well as areas where no information has been collected from the MSs. The generated map and the information pertaining to the MS can be stored in a look-up table, along with other generated maps and information pertaining to other MSs. At step 1025, the DDEA determines whether the application should be instructed to set a journaling mode of the application, based on the generated map and the information (e.g., the location) pertaining to the MS. For example, based on the generated map and the location of the MS, the DDEA can determine that the MS has entered at least one of the areas where problematic events and/or poor quality reading have been received from MSs, or areas where no information has been collected from other MSs. The DDEA may then determine that the application should be instructed to set the journaling mode, to prevent input data of the MS from being lost while the MS is in at least one of the problematic areas. If the application should be instructed to set the journaling mode, the process continues at step 1030. Otherwise, the process continues at step 1035.

At step 1030, the DDEA sends a journaling mode command to the application that instructs the application to set the journaling mode of the application. At step 1035, the DDEA determines whether the application should be instructed to stop the journaling mode, based on the generated map(s) from the look-up table and the information (e.g., the location) pertaining to the MS. For example, based on the generated map and the location of the MS, the DDEA can determine that the MS has exited from at least one of the problematic areas. The DDEA may then determine that the application should be instructed to stop the journaling mode since there is less of a chance that the input data of the MS will be lost. If the application should be instructed to stop the journaling mode, the process continues at step 1040. Otherwise, the process continues at step 1050.

At step 1040, the DDEA sends the journaling mode command to the application that instructs the application to stop the journaling mode of the application. At step 1045, the DDEA receives journaling data from the application that was previously journaled in the MS for committing into a database. At step 1050, the DDEA receives the input data of the MS from the application for committing into the database. In embodiments, the DDEA may cache the input data received from the application for later commitment into the database. At step 1055, the DDEA determines whether to change a commit interval of the DDEA based on the generated map and the information (e.g., location) pertaining to the MS. In embodiments, the commit interval can be a time interval between times when the DDEA commits the input data of the MS, and such a time interval may be initially set to a predetermined value. Additionally and/or alternatively, the commit interval can be, e.g., a count interval of a number of transactions between the MS and the DDEA (e.g., transferring of the input data from the MS to the DDEA). This count interval may be initially set to a predetermined value. For example, the count interval can be set to 10, and thus, at the tenth transaction between the MS to the DDEA, the DDEA commits the received input data (all ten transactions) of the MS. The DDEA may, for instance, change the commit interval (e.g., increase and/or decrease the time interval) when the DDEA determines that the MS has entered and/or exited at least one of the problematic areas on the generated map.

If the commit interval of the DDEA is to be changed, the process continues at step 1060. Otherwise, the process continues in FIG. 11, which is described in detail below. At step 1060, the DDEA changes the commit interval based on the generated map and the information (e.g., location) pertaining to the MS. For example, the DDEA can decrease the commit interval (e.g., the time interval) when the DDEA determines that the MS has entered at least one of the problematic areas on the generated map, and/or increase the commit interval when the DDEA determines that the MS has left at least one of the problematic areas. The process continues in FIG. 11, which is described in detail below.

Figure 11:
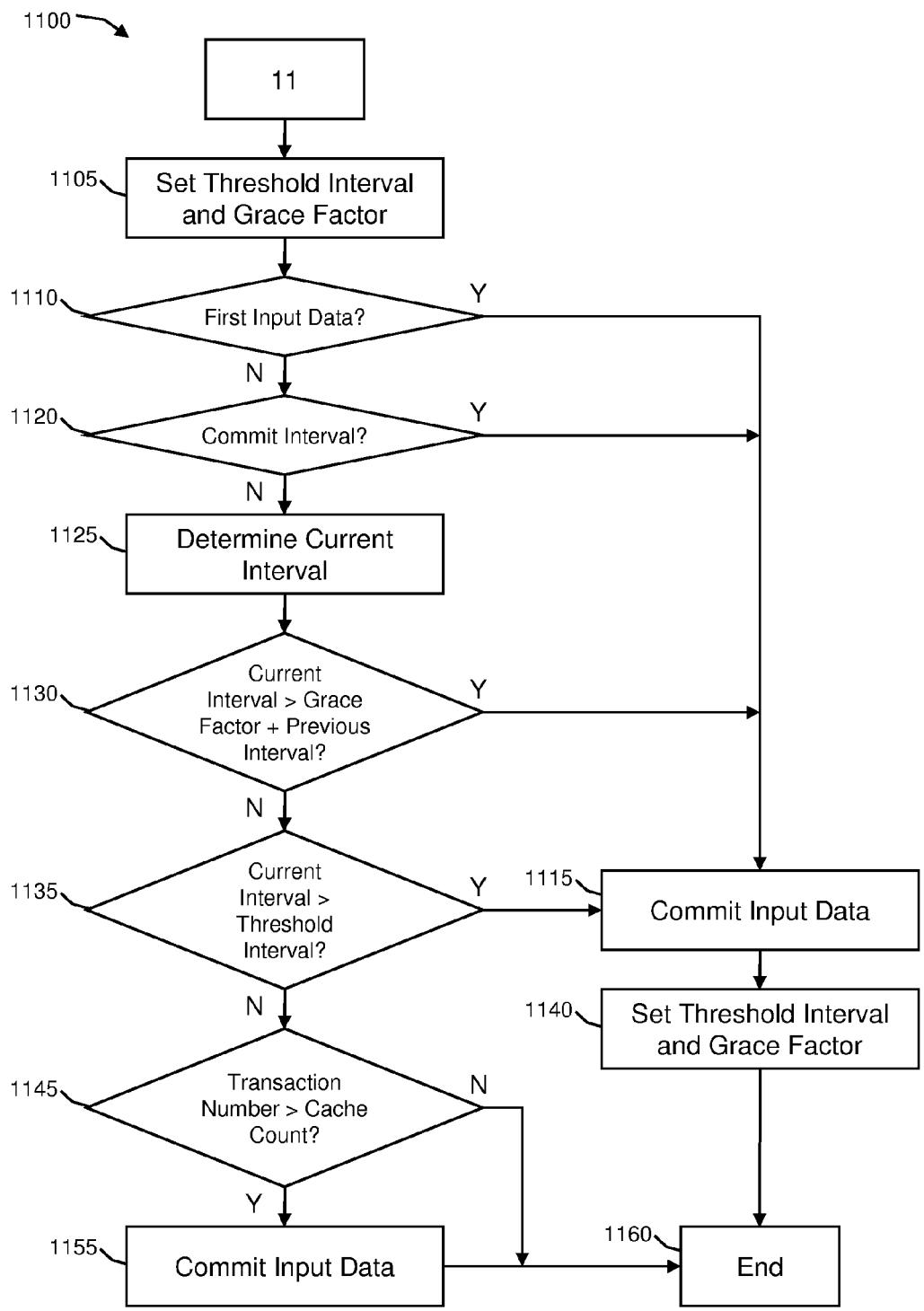

FIG. 11 depicts an exemplary flow for a process 1100 in accordance with aspects of the present invention. In embodiments, the process 1100 can be performed by a DDEA (e.g., the DDEA 405 in FIG. 4) to commit input data received from an application of a MS, e.g., the application 420 of the MS 415 in FIG. 4. At step 1105, the process starts, where the DDEA sets a threshold interval and a grace factor, of the DDEA, based on the input data received from the application. In embodiments, the threshold interval and the grace factor can govern whether the DDEA should commit transactions between the application and the DDEA (e.g., the input data transferred from the application to the DDEA) into a database. The threshold interval may be a time interval. For example, the threshold interval may be a running average of a previous threshold interval and a current interval of time between a time that a current input data of the MS is received at the DDEA and a time that a previous input data of the MS is received at the DDEA. These times can be determined by the DDEA based on, e.g., a timestamp on the input data of the MS. For example, the threshold interval (TD) may be determined by the following equation:

$$TD(n+1)=[TD(n)+(T(n+1)-T(n))]/2 \qquad (1),$$

where n is a number of a transaction between the application and the DDEA, and T(n) is an instantaneous time of a nth transaction (e.g., when a nth input data of the MS is received at the DDEA).

In embodiments, when instantaneous times of a first input data, a second input data, a third input data, a fourth input data, and a fifth input data, of the MS received at the DDEA is $T(1)$, $T(2)$, $T(3)$, $T(4)$, and $T(5)$, respectively, threshold intervals $TD(1)$, $TD(2)$, $TD(3)$, $TD(4)$, and $TD(5)$ can be determined by the following exemplary equations:

$$TD(1)=T(1)-T(0)=0 \qquad (2A);$$

$$TD(2)=TD(1)+(T(2)-T(1))=T(2)-T(1) \qquad (2B);$$

$$TD(3)=[TD(2)+(T(3)-T(2))]/2 \qquad (2C);$$

$$TD(4)=[TD(3)+(T(4)-T(3))]/2 \qquad (2C);$$

$$TD(5)=[TD(4)+(T(5)-T(4))]/2 \qquad (2C),$$

where $T(1)$ is zero, and $T(0)$ does not exist.

In embodiments, the grace factor (TI) of the DDEA can be a time factor that can be determined by the following equation:

$$TI(n)=TI(n-1)+[(T(n)-T(n-1))-TD(n)]*TD(n-1)/TI(n-1) \qquad (3).$$

In embodiments, an initial grace factor $TI(1)$ can be set to a predetermined value, e.g., 0.1.

At step 1110, the DDEA determines whether the current input data of the MS received at the DDEA is the first input data of the MS received at the DDEA. If the current input data is the first input data, then the process continues at step 1115. Otherwise, the process continues at step 1120. At step 1115, the DDEA commits the input data received from the application and any input data that may have been only received from the application and cached in the DDEA.

At step 1120, the DDEA determines whether the commit interval of the DDEA is reached based on the input data received from the application. For example, if the commit interval is the time interval between times when the DDEA commits the input data of the MS, the DDEA can determine whether the current interval of time between the time of the current input data and the time of the previous input data, is greater than or equal to the time interval. If so, the DDEA may determine that the commit interval is reached. In another example, when the commit interval is the count interval of the number of the transaction between the MS and the DDEA when the DDEA commits the input data of the MS, the DDEA can determine whether a number of a current transaction matches the count interval. If the number of the current transaction matches the count interval, the DDEA may determine that the commit interval is reached. If the commit interval is reached, the process continues to step 1115, where the input data received from the application and/or cached in the DDEA is committed into the database. Otherwise, the process continues at step 1125.

At step 1125, the DDEA determines a current interval of time between the time of the current input data of the MS and the time of the previous input data of the MS. In embodiments, these times can be determined by the DDEA based on, e.g., a timestamp on the input data of the MS. At step 1130, the DDEA determines whether the determined current interval is greater than a sum of the set grace factor (e.g., 0.1) and a previous interval of time between the time of the previous input data of the MS and a time of an earlier input data of the MS. For example, this step may be shown as follows:

$$T(n+1)-T(n)>TI(n+1)+(T(n)-T(n-1)) \quad (4).$$

If the current interval is greater than the sum of the grace factor and the previous interval, then the process continues at step 1115, where the input data received from the application and the input data that is cached in the DDEA are committed into the database. Otherwise, the process continues at step 1135. At step 1135, the DDEA determines whether the determined current interval is greater than the set threshold interval. For example, this step may be shown as follows:

$$T(n+1)-T(n)>TD(n+1) \quad (6).$$

If the current interval is greater than the threshold interval, then the process continues at step 1115, where the input data received from the application and the input data that may have been only received from the application and cached in the DDEA, is committed into the database. Otherwise, the process continues at step 1145. At step 1140, after the committing of the input data of the MS and/or while the committing of the input data is undergoing, the DDEA sets the threshold interval and the grace factor, of the DDEA, based on the input data received from the application. In embodiments, this setting of the threshold interval and the grace factor is performed in the manner described above with respect to step 1105. Advantageously, the DDEA's threshold interval and grace factor dynamically adapt to the current interval to determine when the DDEA should commit the input data received from the application. By taking into account the current interval, the DDEA's commit strategy also adapts to a signal strength and a congestion in the MSs wireless communication network.

At step 1145, the DDEA determines whether a number of uncommitted transactions (e.g., input data of the MS received from the application) cached in the DDEA ("a transaction number") is greater than a cache count. In embodiments, the cache count can be a predetermined maximum value of the number of the uncommitted transactions cached in the DDEA, and both the cache count and the number of the uncommitted transactions can be in terms of a memory space and/or a count. The cache count may be set to a default value of a memory space of the DDEA's cache and/or of a maximum count determined by dividing the memory space of the DDEA's cache by an average memory space consumed per transaction. If the number of the uncommitted transactions is greater than the cache count, then the process continues at step 1155. Otherwise, the process continues at step 1160, where the cached input data of the MS remains uncommitted in the DDEA. At step 1155, the DDEA commits the input data received from the application and the input data that may have been only received from the application and cached in the DDEA, into the database. The DDEA commits the cached input data without affecting the threshold interval and the grace factor of the DDEA. At step 1160, the process ends.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principals of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed is:

1. A method, comprising:
receiving input data of a mobile device;
caching the input data to a remote device;
receiving information associated with the mobile device;
sending a journaling mode command to the mobile device which instructs the mobile device to journal the input data, based on the information associated with the mobile device
setting a grace factor based on time intervals between the input data; and
committing the input data into a database based on a determination that a current time interval between the input data is greater than a sum of the grace factor and a previous time interval between the input data.

2. The method of claim 1, further comprising:
receiving an event detected at the mobile device and a location of the mobile device;
generating a map of problematic areas based on at least one of the event, the location, the information associated with the mobile device, and information associated with other mobile devices; and
sending the journaling mode command to the mobile device which instructs the mobile device to journal the input data, based on the generated map and the location.

3. The method of claim 2, wherein the problematic areas comprise areas in which at least one of: dropped calls occurred, poor coverage exists, poor quality signals exist, and no signals are received from the mobile device and the other mobile devices.

4. The method of claim 1, further comprising:
changing a commit interval based on the information associated with the mobile device; and committing the input data into the database based on the commit interval.

5. The method of claim 1, further comprising:
setting a threshold interval based on time intervals between the input data; and
committing the input data into a database based on a determination that a current time interval between the input data is greater than the threshold interval.

6. The method of claim 1, further comprising committing the input data into a database based on a determination that a count of the received input data is greater than a predetermined cache count.

7. The method of claim 1, further comprising requesting the information associated with the mobile device from a Zone Management System (ZMS) which contacts a Zone Controller (ZC) to obtain the information associated with the mobile device.

8. The method of claim 1, wherein a service provider at least one of creates, maintains, deploys and supports a computer infrastructure which performs the steps of claim 1.

9. The method of claim 1, wherein steps of claim 1 are provided by a service provider on a subscription, advertising, and/or fee basis.

10. A method comprising:
receiving input data of a mobile device;
caching the input data to a remote device;
receiving information associated with the mobile device;
sending a journaling mode command to the mobile device which instructs the mobile device to journal the input data, based on the information associated with the mobile device;
committing the input data into a database based on at least one of the information associated with the mobile device and a time interval between the input data;
setting a threshold interval and a grace factor based on time intervals between the input data at least one of after and during the committing of the input data; and
at least one of:
committing the input data into the database based on a determination that a current time interval between the input data is greater than the threshold interval; and
committing the input data into the database based on a determination that a current time interval between the input data is greater than a sum of the grace factor and a previous time interval between the input data.

11. A system implemented in hardware, comprising:
a computer infrastructure operable to:
receive at least a location of a mobile device and mobile device information;
receive input data of the mobile device;
commit the input data into a database based on at least one of the location, the mobile device information, and a current time interval between the input data
set a grace factor based on time intervals between the input data; and
commit the input data into the database based on a determination that the current time interval between the input data is greater than a sum of the grace factor and a previous time interval between the input data.

12. The system of claim 11, wherein the computer infrastructure is further operable to:
generate a map of problematic areas based on at least one of an event detected at the mobile device, the location, the mobile device information, and information received from other mobile devices;
send a journaling mode command to the mobile device which instructs the mobile device to journal the input data, based on the generated map and the location; and
commit the input data into the database based on the generated map and the location.

13. The system of claim 12, wherein the problematic areas comprise areas in which at least one of: dropped calls occurred, poor coverage exists, poor quality signals exist, and no signals are received from the mobile device and the other mobile devices.

14. The system of claim 11, wherein the computer infrastructure is further operable to:
change a commit interval based on at least one of the location and the mobile device information; and
commit the input data into the database based on the commit interval.

15. The system of claim 11, wherein the computer infrastructure is further operable to:
set a threshold interval based on time intervals between the input data; and
commit the input data into the database based on a determination that the current time interval between the input data is greater than the threshold interval.

16. The system of claim 11, wherein the computer infrastructure is further operable to commit the input data into the database based on a determination that a count of the received input data is greater than a predetermined cache count.

17. The system of claim 11, wherein the computer infrastructure is further operable to request the location and the mobile device information from a Zone Management System (ZMS) which contacts a Zone Controller (ZC) to obtain the location and the mobile device information.

18. A computer system for journaling and integrity in mobile collaborative spaces, the system comprising:
a CPU, a computer readable memory and a computer readable storage media;
first program instructions to receive at least one of an event detected at a mobile device, a location of the mobile device, and mobile device information;
second program instructions to generate a map of problematic areas based on at least one of the event, the location, the mobile device information, and information received from other mobile devices;
third program instructions to receive input data of the mobile device;
fourth program instructions to send a journaling mode command to the mobile device which instructs the mobile device to journal the input data based on the generated map and the location; and
fifth program instructions to commit the input data into a database based on at least one of the generated map, the location, and a current time interval between the input data, wherein the first, second, third, fourth, and fifth program instructions are stored on the computer readable storage media for execution by the CPU via the computer readable memory.

19. The computer system of claim 18, further comprising:
sixth program instructions to change a commit interval based on the generated map and the location;
seventh program instructions to commit the input data into the database based on the commit interval;
eighth program instructions to set a threshold interval and a grace factor based on time intervals between the input data;

ninth program instructions to commit the input data into the database based on a determination that a current time interval between the input data is greater than the threshold interval; and tenth program instructions to commit the input data into the database based on a determination that the current time interval between the input data is greater than a sum of the grace factor and a previous time interval between the input data, wherein the sixth, seventh, eighth, ninth, and tenth program instructions are stored on the computer readable storage media for execution by the CPU via the computer readable memory.

\* \* \* \* \*